July 3, 1962 D. J. HALSEY 3,042,347
EMERGENCY EJECTION SEAT
Filed Jan. 27, 1958 2 Sheets-Sheet 1
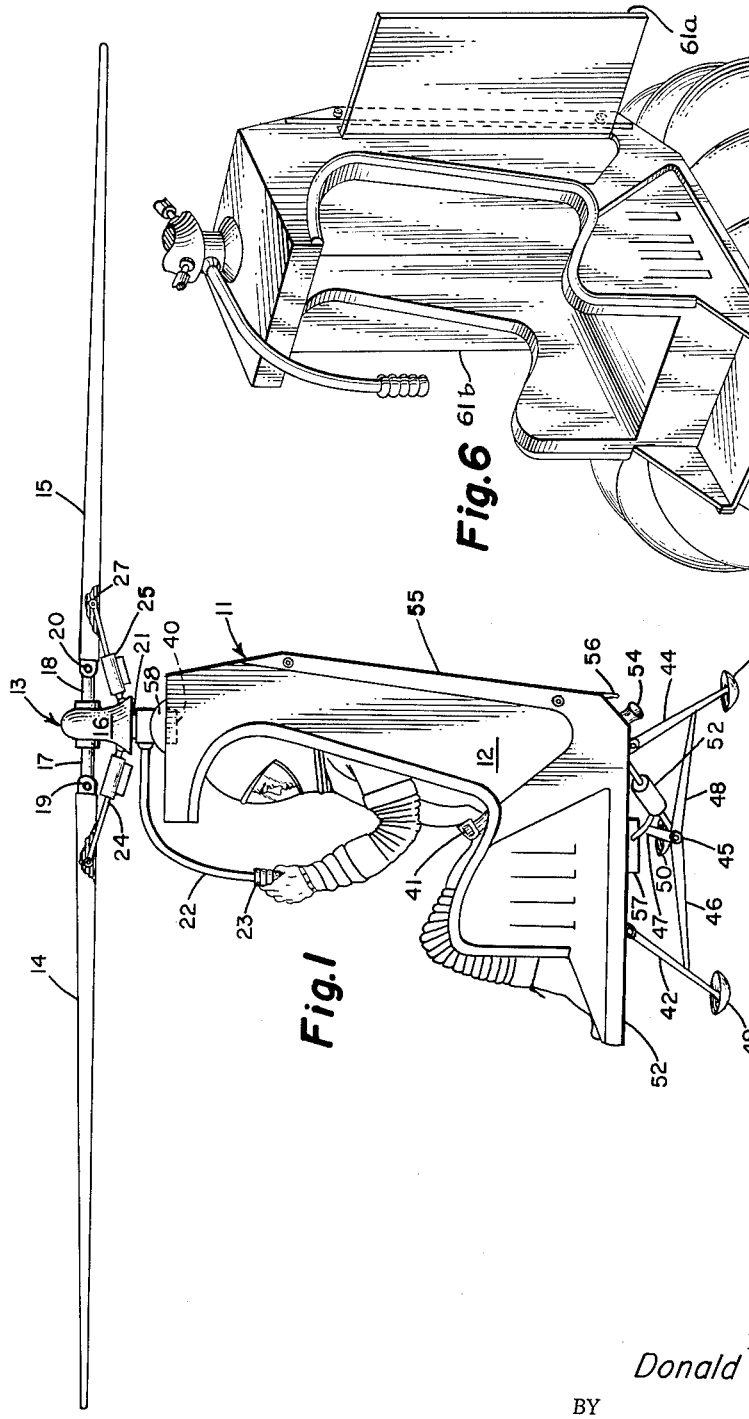
INVENTOR.
Donald J. Halsey
BY
*J. K. Nichols*
AGENT July 3, 1962

D. J. HALSEY 3,042,347

EMERGENCY EJECTION SEAT

Filed Jan. 27, 1958

INVENTOR.
Donald J. Halsey
BY
J. H. Nichols
AGENT

Patent 3,042,347

3,042,347
EMERGENCY EJECTION SEAT
Donald J. Halsey, Arlington, Tex., assignor, by mesne assignments, to Ling-Temco-Vought, Inc., Dallas, Tex., a corporation of Delaware
Filed Jan. 27, 1958, Ser. No. 711,325
4 Claims. (Cl. 244—141)

This invention pertains to an aircraft emergency seat ejection system comprising an ejection seat having a rotor parachute-replacement means.

More specifically, this invention comprises a combination of an aircraft ejection seat with a controllable and an autorotatable rotor wherein the rotor has foldable blades for compactness in the aircraft, is tiltable for control by the seat occupant or pilot after ejection for providing a controlled descent to the ground, and has collective pitch for varying the rate of descent. A blade unfolding and shock absorbing device is provided having valve means for permitting unfolding of the blades in proportion to the decrease in dynamic pressure at the seat.

Herebefore in aircraft escape systems, the pilot and seat were ejected together and then the two separated. The pilot, after being separated from the seat, is then exposed to high velocity slipstream, wind pressure, and the elements.

While various simple lowering containers for cargo and/or people have been designed as shown in U.S. Patent 2,440,294 and British Patent 146,516, these devices are inoperative for use in an emergency or impossible to use and combine with the pilot's emergency ejection seat.

Accordingly, it is a principal object of this invention to provide a safety lowering device that, when ejected from a fast-moving aircraft, will gradually diminish in forward speed within tolerable limits and will then gently and safely descend to the ground.

It is another object of this invention to provide a safety lowering ejection seat for a pilot or passenger, wherein the seat and its occupant, after ejection from a fast-moving aircraft, will gradaully diminish in forward speed within safe and tolerable limits and will then gently and safely descend to the ground.

Another object of this invention is to provide a parachute-replacement device for an emergency ejection seat which is not limited by the parachute limitations of a maximum temperature of 400° F. or a maximum velocity of 425 knots EAS (equivalent air speed at sea level) and which obviates other weaknesses of a parachute such as fouling of the lines, squidding of the parachute, tearing of the panels, failure of timing devices and aneroids, and instability (oscillation).

A further object of this invention is to provide a safety lowering ejection seat for an occupant whereby a parachute is not required to be carried, but instead, a rotor is provided with foldable blades for unfolding after ejection of the seat to diminish forward speed of the occupant at a safe rate of deceleration and to safely lower the occupant to the ground.

Yet another object of this invention is to provide for an occupant a safety lowering ejection seat having a rotor with foldable blades and a blade unfolding device for unfolding the blades subsequent to seat ejection at a rate in proportion to the decrease in dynamic pressure at the seat for gradual and safe decrease of forward speed followed by safe lowering of the seat and its occupant to the ground.

Other objects and various advantages of the disclosed rotor parachute replacement emergency ejection seat will be apparent from the following detailed description, together with the accompanying drawings, submitted for purposes of illustration only and not intended to define the scope of the invention, reference being had for that purpose to the subjoined claims.

Briefly this invention comprises the feature of replacing the pilot's parachute with an ejection seat having a free-wheeling rotor attached to the top thereof. Instead of the pilot having to separate himself from his seat after being ejected from his disabled aircraft, opening his parachute, and, descending to the ground, the pilot when using the instant invention now may remain in his ejection seat throughout his emergency exit until he is safely on the ground. While the ejection seat is in the aircraft, the two blades are folded alongside the seat. Upon ejection, the blades are slowly opened at a rate proportional to the decrease in dynamic pressure at the seat in order to diminish the forward speed for safely lowering of the seat with the pilot therein. In addition, a cartridge may be utilized to provide a prerotation of the rotor after ejection but prior to downward movement of the seat. The seat occupant or pilot may "bail out" of the seat as he descends, if he so desires, or he may remain seated and control his rate and direction of descent with a control stick provided.

The drawings diagrammatically illustrate by way of example, not by way of limitation, one form of the invention wherein like reference numerals designate corresponding parts in the several views in which:

FIG. 1 comprises an enlarged view of the rotor parachute-replacement emergency ejection seat in operative position;

FIG. 6 is a modification of the rotor parachute-replacement emergency ejection seat of FIG. 1.

Figure 4:
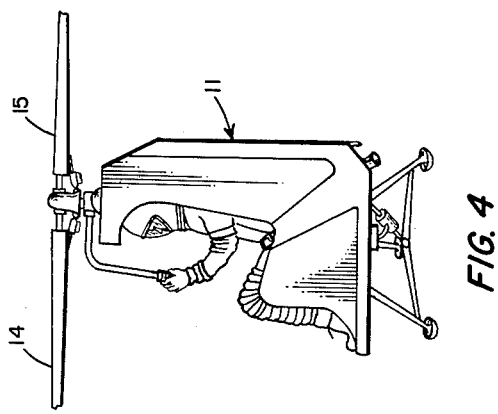
FIG. 4 shows the seat after forward movement has ceased and the seat is descending.

The invention disclosed herein is not limited in its application to the details of construction and arrangement of parts illustrated in the accompanying drawings, since the invention is capable of other embodiments and of being practiced or carried out in various other ways. Also it is to be understood that the phraseology or terminology employed herein is for the purpose of description and not of limitation.

The disclosed invention includes an emergency aircraft ejection seat 11 having a rotor parachute replacement means for safely carrying the seat occupant or pilot from an aircraft 10 to the ground without requiring the use of a parachute.

This parachute-replacement rotor obviates the necessity of a parachute for safely decelerating the pilot after ejection and lowering him to the ground. The parachute replaced is inoperable and self destruction occurs above a temperature of 400° F., i.e., the sum of the temperature rise due to velocity and the ambient air temperature due to burning and is inoperable above 425 knots EAS due to tearing.

Other weaknesses of the parachute which are eliminated by the disclosed rotor ejection seat are fouling of the lines, squidding of the parachute, tearing of the panels, failure of timing devices and aneroids, and instability as by oscillation.

The term "ejection seat" used hereinafter is equally applicable to the conventional aircraft emergency ejection seat 11 illustrated and described herein, as to an aircraft emergency ejection seat which is closed in further and additionally streamlined, if so desired, to form an aircraft emergency ejection capsule.

The sides of the seat, only one side 12 being shown are flat so as to act as vertical stabilizing fins. The seat may be armor-plated when more protection is desired than is offered by the conventional aircraft ejection seat. This rotor parachute-replacement emergency ejection seat provides many of the advantages of a capsule with regard to protection while descending and yet provides the freedom of an ordinary ejection seat.

A rotor 13 is provided with free-wheeling rotor blades, this embodiment including two blades 14 and 15, for example, connected to a rotor hub 16 through connecting rods 17 and 18. While one end of each of the connecting rods 17 and 18 is fixedly attached to the rotor hub, the other end of each rod is pivotally connected with flapping hinge pins 19 and 20, respectively, to the blades 14 and 15 whereby the blades may be folded downwardly alongside the pilot's ejection seat prior to ejection.

The rotor hub 16 may be tilted with a supporting shaft 21 by a control stick 22 for directional control of the descending seat. As illustrated in FIG. 1, while the rotor hub 16 is preferably rotatably connected to the supporting shaft 21 which in turn is swivelable by control stick 22 about the universal joint 58 on the top of the ejection seat, the rotor hub may be fixed to the supporting shaft which in turn would be rotatable about the universal joint in addition to being swivelable by the control stick. This control stick changes the hub axis for directional control of the seat throughout the descent. This type of control is illustrated in "Aerodynamics of the Helicopter" by A. Gessow and G. C. Myers, Jr., page 164. A conventional collective pitch control system is mounted on the rotor shaft 21 and provides collective pitch control of the blades for varying the angle of pitch for two reasons. One, the pitch is varied to provide least terminal velocity, i.e. lowering the rate of descent, particularly at the instant of contact with the ground. Two, the rotor blades may be varied in pitch collectively to provide a rapid descent through most of the drop with flaring out or slowing down just over the ground if vulnerable to enemy gunfire or in the situation of a high wind blowing one out to sea, etc.

The rotor blades serve the additional function of providing weather cock stability of the seat from the time it is ejected until it is descending to the ground. The rotor blades act to fin stabilize the seat on first impact with the airstream to avoid tumbling and gyrations of the seat with the occupant therein.

Two rotor blade unfolding and shock absorbing means 24 and 25 are pivotally connected between the blades 14 and 15, respectively, and the rotor hub 16 for unfolding the blade at a predetermined rate. The preferred rate is proportional to the decrease in dynamic pressure at the seat.

Figure 5:
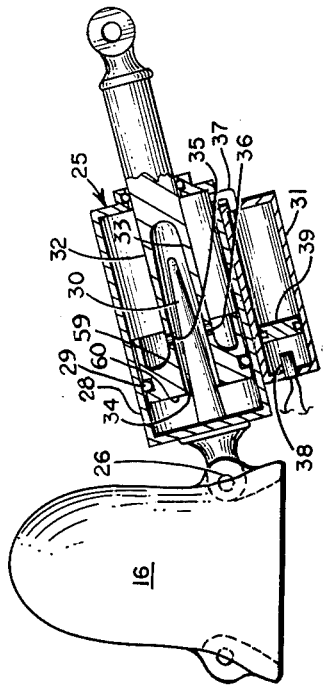
FIG. 5 is a detailed view of a blade unfolding device connected to the rotor hub for slowly unfolding a blade.

FIG. 5 discloses one blade unfolding and shock absorbing controlling means 25 as pivotally connected to the rotor hub at one end with a pin 26 and connected at the other end to a rotor blade with a pin 27. This control device comprises a control cylinder 28, control piston 29, a control metering pin 30, and a reservoir 31. The piston 29, which is slideable in the cylinder 28 has a piston ring and an integral connecting rod 32 for connecting to a rotor blade with the pin 27, FIG. 1. Both the piston and its connecting rod has a bore 33 for receiving the metering pin 30 which is fixedly secured internally to the end of the cylinder adjacent the rotor hub. While various shaped bores and metering pins may be used, the preferred embodiment has a cylindrical bore for receiving a tapered pin wherein a variable restricted orifice 34 is formed between the peripheral surface of the metering pin and the outer end of the bore. Orifice 34 provides a shock absorbing and damping action to opening of the blades. Passages 35 and 36 which have a greater cross-sectional area than orifice 34 are formed in the connecting rod for passage of fluid between the bore and outside of the rod whereby fluid may flow in either direction from one side of the piston to the other side via the piston and connecting rod bore and the connecting rod passages.

Figure 2:
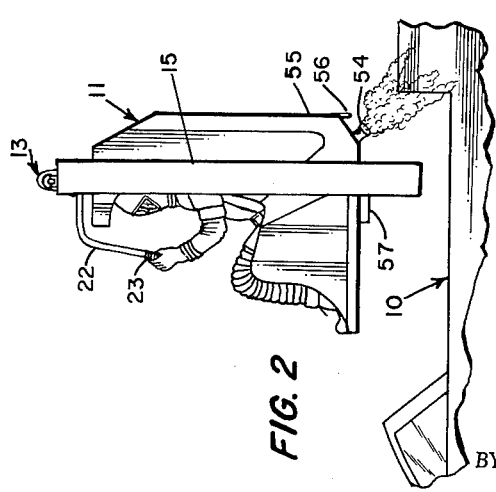
FIG. 2 shows the new ejection seat immediately after it has been catapulted from the aircraft.

The reservoir 31, while shown attached directly to cylinder 28 as by welding, or the like, may be a separate container, if so desired, with the fluid passage 37 connecting the reservoir with the cylinder on the side of the piston opposite the piston orifice 34. On the opposite end of the reservoir from its fluid passage 37 is a cartridge 38 energized or fired simultaneously with ejection of the seat by any conventional means such as pulling of the seat ejection handle (not shown) or by means for firing cartridge 38 simultaneously with activation of the ejection nozzle 54 (FIG. 2). A piston 39 separates the cartridge from hydraulic fluid in the remainder of the reservoir and fluid which completely fills the cylinder 28. Upon firing of the cartridge, the expanding gases tend to force reservoir piston 39 to the right as seen in FIG. 5, which increases the pressure in the hydraulic fluid both in the reservoir 31 and the control cylinder 28, as seen in FIG. 5. After complete burning of the cartridge, cooling of the cartridge gases takes place which reduces the pressure due to the expanded gas.

It will be understood that during ejection of the seat it is necessary to maintain the rotor blades in their stowed position alongside the seat since their movement from the stowed position could interfere with aircraft structural members and thus abort a proper ejection. Also, the aerodynamic forces acting on the rotor blades immediately following ejection, especially at high speeds, while the seat is in its forward travel are generally so high as to be structurally intolerable if the blades were allowed to unfold in response to these aerodynamic forces without some sort of damping device. Consequently, the blade unfolding and shock absorbing controlling means 25 serves the dual purpose of maintaining the blades in their stowed position alongside the seat during the ejection sequence and of governing the blade unfolding in response to the change in dynamic pressure on the blades following seat ejection from the aircraft. Thus, when cartridge 38 is activated simultaneously with seat ejection, the build-up of pressure will initially act on face 59 of piston 29 to maintain connecting rod 32 in its retracted position and to hold blades 14 and 15 in their stowed positions alongside the seat during ejection. As the cartridge gases cool the pressure build-up on piston face 59 subsides and pressure equalization on both sides of piston 29 takes place. When the seat is ejected from the aircraft the momentum of the aircraft and the thrust from nozzle 54 will cause the seat to have a forward travel until slowed down by aerodynamic forces. During the forward movement of the seat the dynamic pressures acting on the rotor blades urging them to an extended position exert a pull to the right on rod 32, FIG. 5, resulting in increased pressure in the hydraulic fluid on the right hand side of piston 29, urging the fluid through passages 35 and 36 toward the left hand side of piston 29. However, orifice 34 meters the flow of fluid to the left hand side of the piston, restricting the rate of movement of piston 29 to the hight relative to tapered metering pin 30 and thus restricting the rate of movement of the blades. As the seat slows down in its forward movement, the dynamic pressure on the blades decreases but the area of orifice 34 has increased due to movement of piston 29 relative to tapered metering pin 30, allowing a greater amount of hydraulic fluid to flow from the right hand side of piston 29 to its left hand side until the rotor blades are in full operative position when the seat has reached the limit of its forward travel and has begun its descent. It will be understood, of course, that the magnitude of the dynamic pressure will vary with altitude as well as with the momentum of the seat upon ejection but it will be seen that the control device 25 will govern the rate of unfolding of the rotor blades smoothly in response to the dynamic pressure acting on the blades.

While some forward movement of the seat occurs immediately subsequent to seat ejection due to the rocket exhaust from nozzle 54, immediate rotation of the rotor blades is provided principally by the airstream into which the emergency ejection seat is catapulted from the aircraft and is not wholly dependent on the forward motion of the seat. Therefore, a great amount of kinetic energy is stored in the rotating blades to provide immediate lift subsequent to diminishing of forward movement and beginning of downward movement.

If so desired and for additional prerotation of the blades, a cartridge 40 FIG. 1, may be inserted in the rotor hub 16 for being fired by the movement of the ejecting seat or immediately following ejection to provide an initial prerotation of the blades to supplement the blade rotation provided by the forward movement of the ejection seat with the gradually opening rotor blades in the airstream. Cartridge 40 may provide additional prerotation of the blades in a supplementary blade rotation device comprising a conventional turbine internally of the rotor housing on the rotor shaft with pressure supplied by a solid propellant gas generator similar to that shown in U.S. Patent 2,005,913. Continued rotation of the free-wheeling blades is maintained by the relative upward movement of the air.

In addition to acting as a vertical stabilizer, the flat sides of the emergency ejection seat as illustrated by side 12 prevent rotation of the seat due to friction between the rotating rotor and the seat when descending. Other spin stabilizing means may be utilized, if so desired, as by the addition of an extendible vane 61a and 61b to each side of the seat whereby aerodynamic forces resist spin due to the above-described friction, as illustrated in FIG. 6.

A seat harness 41 is provided which is automatically released with pivotal movement of the landing gear upon contact with the ground by any conventional harness release (not shown). Further of course, if the seat occupant has a parachute and so desires, he may unbuckle his seat harness at any time during his descent and "bail out" of the seat.

The landing gear comprises a retractable tripod having three ground engaging struts 42, 43 (not shown) and 44 pivotally connected to the bottom of the seat with three links 46, 47, and 48 pivotally connected to the respective landing struts. Each of the landing gear struts has a ground engaging pad 49, 50, and 51, respectively. The three links are all pivotally connected with a common attachment, as a pin 45, to at least one conventional combination landing gear extending motor and pneumatic-oleo shock absorber 52 for extending the landing gear upon ejection and for reducing the landing shock.

Figure 3:
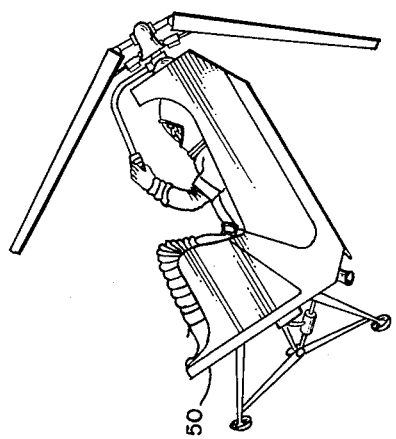
FIG. 3 shows the new ejection seat with the gradually unfolding blades decreasing the forward speed of the seat.

A suitable trigger 56 is provided on the back of the ejection seat 11 which contacts a portion of the aircraft structure as the seat ejects for firing a cartridge 57 for actuating the extending motor and shock absorber 52 for spreading the landing gear to the landing position shown in FIGS. 1, 3, and 4. While only a tripod is illustrated, other types of landing gear may be used such as an inflatable bag or the like as illustrated in FIG. 6. A typical inflatable bag on the bottom of the seat shown in the figure is inflated at a timed interval after ejection, similar to the collapsible cushioning bags disclosed in U.S. Patent 2,621,874.

The bottom 53 of the ejection seat is formed flat and may, if desired, provide lift for maintaining altitude during the first portion of the ejection subsequent to being tilted back by the weathervaning or stabilizing action of the opening rotor blades if the rest of the seat is so aerodynamically designed.

While any suitable ejecting means may be utilized on the disclosed aircraft ejection seat 11, a continuous gaseous-jet-discharge, expansion-reaction prime mover type having an exhaust nozzle 54 is preferred and which may be similar to that shown in Patent 2,552,181, and with additional guide rails 55, if so desired.

While this rotor parachute-replacement device is designed principally in combination with an aircraft emergency ejection seat for emergency use to provide a safe deceleration of forward movement and gentle descent to the ground of a human being, this invention may be modified to provide a gradual deceleration and safe lowering of a fragile cargo as a parachute-replacement not involving the limitations of a parachute.

In operation the emergency ejection seat or emergency ejection capsule is ejected as shown in FIG. 2 with the blades folded alongside the seat. The seat is stabilized or weathervaned by the rotor blades as they are gradually opened by the blade unfolding and shock absorbing device. During this forward movement the blades are given an initial pre-rotation by both the airstream and a cartridge starter whereby kinetic energy is stored up in the blades resulting in a diminishing of forward movement, and this energy is released for prevention of immediate downward falling by providing a substantial amount of lift at the very beginning, particularly useful for zero altitude seat ejection. Upon diminishing of the forward movement of the seat, and increasing of downward movement, the rate and direction of descent is thus controlled by the control stick. As the seat descends, rotation of the free-wheeling blades is maintained by the relative upward movement of the air. If the occupant has a parachute and so desires he may release himself from his harness and "bail-out" of the seat, or he may elect to stay in the seat and descend therein to the earth.

Accordingly, a rotor parachute-replacement emergency ejection seat has been disclosed which will gradually decrease in forward speed within tolerable limits in proportion to the decrease in dynamic pressure at the seat immediately after ejection into the high velocity slip stream and then will gently and safely descend to the ground. The disclosed rotor emergency aircraft ejection seat is operable in slip streams having characteristics above the parachute maximum limitations of 400° F. or 425 knots and does not have the parachute weaknesses of fouling of lines, squidding, tearing of panels, failure of timing devices and aneroids, and instability as by oscillation.

While only one embodiment of the invention has been shown in the accompanying drawings, it will be evident that various modifications are possible in the arrangement and construction of the rotor parachute-replacement emergency ejection seat without departing from the scope of the invention.

I claim:

1. An emergency ejection seat comprising, an aircraft ejection seat adapted to be ejected from an aircraft, ejection means and guide means for said seat, said seat being ejected by said ejection means and guided from the aircraft by the guide means, a landing gear on said ejection seat for absorbing the landing shock, spin stabilizing means for preventing rotation of the seat, a rotor connected to the top of said seat, said rotor having a hub, a plurality of blades pivotally connected to said rotor hub for folding alongside said ejection seat, and fluid unfolding means connected between one of said blades and said hub for gradually unfolding said one blade at a predetermined rate, said unfolding means comprising a cartridge actuated hydraulic means.

2. In combination with an ejection seat of an aircraft, a descending device comprising: a bladed sustaining rotor providing for retarded descent of the seat; means for mounting said rotor on the seat, the mounting means providing for positioning of the rotor blades alongside the ejection seat for compact stowage in the aircraft prior to ejection and providing for support of the rotor blades in their operative position; and cartridge actuated hydraulic means operatively connected between each of said blades and said mounting means for maintaining the blades in their stowed position during ejection of the seat from the aircraft.

3. In combination with an ejection seat of an aircraft, a descending device comprising: a blade sustaining rotor providing for retarded descent of the seat; means for mounting said rotor on the seat, the mounting means providing for positioning of the rotor blades alongside the ejection seat for compact stowage in the aircraft prior to ejection and providing for support of the rotor blades in their operative position; and means operatively connected between said rotor blades and said mounting means for maintaining the blades in the stowed position during ejection including an hydraulic cylinder for each blade, a piston within said cylinder connected to the rotor blade, and cartridge means in said cylinder adapted to be actuated simultaneously with ejection of the seat from the aircraft, the explosion gases from the cartridge exerting temporary pressure on the piston to maintain the blade in its stowed position during ejection.

4. In combination with an ejection seat of an aircraft, a descending device comprising: a bladed sustaining rotor providing for retarded descent of the seat; means for mounting said rotor on the seat, the mounting means providing for positioning of the rotor blades alongside the ejection seat for compact stowage in the aircraft prior to ejection and providing for support of the rotor blades in their operative position; and an hydraulic damping strut operatively connected between said rotor blades and said mounting means for moving the blades from their stowed position to their operative position at a rate of movement governed by the dynamic pressure on the blades following ejection of the seat from the aircraft, said hydraulic damping strut comprising a cylinder filled with hydraulic fluid, a piston within said cylinder, and a tapered metering pin extending within a cavity of said piston to form a variable metering passageway for the transfer of hydraulic fluid from one side of said piston to the other side of said piston.

References Cited in the file of this patent

UNITED STATES PATENTS

| | | | |
|---|---|---|---|
| 2,329,414 | Nelson | Sept. 14, | 1943 |
| 2,378,712 | Laraque | June 19, | 1945 |
| 2,426,585 | Bean et al. | Sept. 22, | 1947 |
| 2,440,294 | Campbell | Apr. 27, | 1948 |
| 2,440,295 | Synnestvedt | Apr. 27, | 1948 |
| 2,527,020 | Martin | Oct. 24, | 1950 |
| 2,552,181 | Kleinhans | May 8, | 1951 |
| 2,591,867 | Prower et al. | Apr. 8, | 1952 |
| 2,684,213 | Robert et al. | July 20, | 1954 |
| 2,702,680 | Heinemann et al. | Feb. 22, | 1955 |
| 2,781,183 | Kaplan | Feb. 12, | 1957 |
| 2,829,850 | Culver | Apr. 8, | 1958 |
| 2,836,383 | Oleksij | May 27, | 1958 |
| 2,900,150 | Hirt et al. | Aug. 18, | 1959 |
| 2,944,771 | Bush | July 12, | 1960 |

FOREIGN PATENTS

| | | | |
|---|---|---|---|
| 146,516 | Great Britain | July 14, | 1921 |
| 702,149 | Great Britain | Jan. 13, | 1954 |

OTHER REFERENCES

Life Magazine, page 120, November 5, 1956.
Aviation Week Magazine, Nov. 12, 1956, vol. 65, No. 20 (pages 71, 72, 74 and 77).